United States Patent Office 3,275,662
Patented Sept. 27, 1966

3,275,662
PROCESS FOR THE LIQUID PHASE DIRECT OXI-
DATION OF OLEFINS TO OLEFIN OXIDES
Virgil W. Gash, Ballwin, Mo., assignor to Monsanto Company, a corporation of Delaware
No Drawing. Filed Nov. 29, 1963, Ser. No. 327,095
13 Claims. (Cl. 260—348.5)

This application is a continuation-in-part of copending U.S. application Serial No. 216,966, filed August 15, 1962, and now abandoned.

This invention is directed to a new and improved process for the preparation of olefin oxides (epoxides). It is further directed to an improved solvent for use as an oxidation medium for the preparation of olefin oxides by the action of molecular oxygen upon olefins.

Still more particularly this invention relates to a process for the direct expoxidation of epoxidazable olefinically unsaturated compounds with molecular oxygen in a solvent comprising certain esters of acetic acid.

Olefin oxides are extremely useful articles of commerce. They are used as starting materials for the preparation of anti-freeze compositions, humectants, pharmaceutical preparations, cosmetic formulations, as monomers for the preparation of polymers useful in preparing polyurethanes, and the like. Notable among these epoxides are ethylene oxide and propylene oxide. Currently, these are prepared by a vapor phase catalytic method and by the classic two-step chlorohydrin route, respectively. The vapor phase process, insofar as industrial production of epoxides is concerned, is apparently confined to the preparation of ethylene oxide. Higher olefins have yet to be used in a vapor phase catalytic process to give economic production of the corresponding oxides. The older chlorohydrin route is the principal industrial process which supplies the largest quantities of propylene oxide for commerce. This process is suitable for conversion of ethylene and propylene to their corresponding epoxides, but higher olefins are not particularly adaptable to the chlorohydrin route.

Still a third process for preparation of olefin oxides is that involving peracetic acid oxidation of olefins to the corresponding oxides. This process appears to have wider application insofar as olefin structure is concerned than do the first two methods mentioned. It apparently proceeds by an ionic mechanism, and the rate of epoxidation using peracetic acid is characteristic of the structure of the olefin. For example, highly substituted ethylenes for example tetramethylethylene and trimethylethylene react smoothly and rapidly with peracetic acid to give the corresponding epoxides. However, ethylenic compounds having much lower degrees of substitution about the carbon to carbon double bond, for example, ethylene and propylene, by virtue of the ionic nature of the reaction, react sluggishly with peracetic acid and the rate of formation of the corresponding epoxides is very slow.

Nevertheless, each of these aforementioned processes has inherent disadvantages. For example, vapor phase catalytic oxidation of ethylene to ethylene oxide requires large volume equipment and the handling of tremendous quantities of potentially explosive mixtures of ethylene and oxygen. The second process, that is, the chlorohydrin route, for propylene oxide essentially involves a two-step process; in addition, chlorinated byproducts arise in this process. The third process, involving peracetic acid oxidation of olefins, is potentially hazardous if relatively large quantities of peracetic acid are to be used. It is noted, however, that the peracetic acid process is probably the most versatile of the three methods; it is applicable to a far greater range of olefin structures than is the vapor phase catalytic process or the chlorohydrin process.

There are scattered references to still a fourth method of preparing olefin oxides, namely the liquid phase oxidation of olefins with molecular oxygen. Several of these are restrictive in the sense that specific limitations are incorporated in each method. For example, catalysts or other additives or secondary treatment of the oxidation mixtures with basic materials are essential features of these methods.

Since the present invention is concerned with a novel liquid phase epoxidation system, the discussion below will be directed to typical existing prior art schemes for liquid phase olefin oxidations. These prior art processes describe a variety of approaches to a proper balance of a series of reaction variables in order to obtain the desired olefin oxide. For example, various specific oxidation catalysts, catalyst-solvent or catalyst-modifier-solvent systems have been described (U.S. Patents 2,741,623, 2,837,424, 2,974,161, 2,985,668 and 3,071,601); another approach is the incorporation of oxidation anticatalysts which retard certain undesirable side reactions (U.S. Patent 2,279,470); still another approach emphasizes the use of water-immiscible hydrocarbon solvents alone, or in the presence of polymerization inhibitors such as nitrobenzene (U.S. Patent 2,780,635); or saturated hydrocarbons (U.S. Patent 2,780,634); another method describes the use of neutralizers such as alkali metal and alkaline earth metal hydroxides, or salts of these metals (U.S. Patent 2,838,524); another approach involves the use of certain catalysts in an alkaline phase (U.S. Patent 2,366,724), or a liquid phase maintained at specified critical pH values (U.S. Patent 2,650,927); and still other approaches emphasize criticality of oxygen pressure (U.S. Patent 2,879,276), or the geometry of the raction zone (U.S. Patents 2,530,509 and 2,977,374). The foregoing represent prior art approaches to problems encountered in the utilization of a liquid phase oxidation process to obtain olefin oxides.

It is the primary object of the instant invention to provide a superior process for commercial production of olefin oxides which process is free of numerous limitations recited in prior art processes.

A further object of this invention is to provide a liquid phase process for the production of olefin oxides which is not dependent upon the presence or absence of any catalyst; nor dependent upon the presence of water-immiscible solvents or upon solvents containing added buffers or acid neutralizers or other additives or secondary treatments with alkaline materials to remove acidic components; nor is it dependent upon the presence of saturated compounds, initiators or anticatalysts; further it is not dependent upon critical reactor geometries, temperatures, pressures, pH level, oxygen concentration flow rates, or reactant ratios.

It is a further object of this invention to provide a new class of solvents for direct epoxidation of olefins with molecular oxygen.

It is an additional object of this invention to provide a new process which is applicable to a wide range of olefin structures; that is, it is not limited to a single olefin or two, but rather, has a broad application over a large class of unsaturated compounds.

It is an additional object of this invention to provide a new process which requires relatively small scale equipment and does not involve the hazards associated with certain of the prior art processes, eg., the vapor phase process.

Other objects of this invention are to provide a process for production of olefin oxide in batch or continuous manner by a method which is simple, safe, economical and dependable.

These and other objects of the invention will become apparent to those skilled in the art as description of the invention herein proceeds.

According to the present invention, it has been discovered that epoxidizable olefinically unsaturated compounds can be oxidized to epoxides with molecular oxygen in high conversions and yields when the oxidation is allowed to proceed in a liquid reaction medium comprising at least one acetic acid ester having the following general formula:

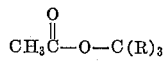

wherein the R's may be alike or unlike and represent hydrogen, straight chain alkyl or haloalkyl groups having from 1–3 carbon atoms, or straight chain alkyl or haloalkyl groups of from 1–3 carbon atoms having as substituents on other than the terminal carbon thereof at least one member selected from the group consisting of straight and branched chain alkyl or haloalkyl groups having from 1–3 carbon atoms. An essential limitation upon the selection of solvents within the generic formula above for use in olefin oxidations is that the alphacarbon, i.e., the carbon adjacent to the oxy oxygen (—O—) have not more than one methylene group (—CH$_2$—) attached thereto.

It is a characteristic feature of the specific group of acetic acid esters disclosed herein, that no labile hydrogen atoms be present on the alpha-carbon and that not more than one methylene group be attached to the alpha-carbon. The methylene group attached to the oxy oxygen in an ester is normally unstable as in ethers, and readily oxidized with molecular oxygen. It is a feature of the instant solvents that bonds between the apha-carbon and hydrogen atoms attached thereto are protected against cleavage by a screening effect or steric hindrance afforded by the presence of stable groups attached to or proximate to the alpha-carbon. Hence, these esters are stable in the present oxidation system. Preferably, these stable substituents are methyl radicals or branched chain groups having no labile hydrogen atoms and are attached to at least two of the three available valence bonds of the alpha-carbon (the fourth set of valence electrons consisting of the carbon to oxygen bond). However it is not essential that these stable groups be attached directly to the alpha-carbon but they must be in a proximal relationship thereto as defined above. In an operable embodiment of the invention, an ester according to the above general formula can have a four-carbon straight chain alkyl group with up to three methylene groups attached to the oxy oxygen, i.e., a butyl radical. In another embodiment, the isopropyl radical can be attached to the oxy oxygen atom. In both of these embodiments, hydrogen atoms are attached to the alpha-carbon, but because of the proximity of stable methyl groups, the hydrogen atoms are stabilized against abstraction by oxygen.

Acetic acid esters according to the present invention are suitably useful either individually or in admixtures thereof. For example, mixtures of methyl acetate, ethyl acetate, isopropyl acetate, tertiarybutyl acetate and the like in varying combinations and in any proportion constitute desirable solvents according to the present invention. A typical combination is a 50–50 wt. percent mixture of methyl acetate and ethyl acetate.

Of the acetic acid ester solvents disclosed herein, the most preferred member is methyl acetate because of its ease of preparation and ready availability, as well as its frequent appearance as a by-product in olefin oxidations.

Still other solvents within the above formula which are suitable herein the following are typical: Ethyl acetate, n-propyl acetate, n-butyl acetate, t-butyl acetate, 1,1-dimethyltrichloroethyl acetate, 1,1-dimethylpropyl acetate, 3,3-dimethylbutyl acetate, 1-tertiarybutyl-3-fluorobutyl acetate, methylbutyl acetate, 1,1,3,3-tetramethylbutyl acetate, and neopentyl acetate.

The acetic acid ester solvents are readily prepared by conventional methods of reacting acetic acid with the corresponding alcohol of the desired ester.

The solvents used in the present invention combine essential characteristics and features required for successful liquid phase oxidation, that is, they are essentially chemically indifferent and are oxidatively and thermally stable. Furthermore, the instant solvents are superior to those disclosed in prior art liquid phase olefin oxidation processes in that they do not require buffers, neutralizers, initiators, promoters, modifiers, inhibitors and/or catalysts in order to utilize the above-mentioned essentials to effect oxidation of the olefin to the olefin oxide in high yield and conversion. Solvents of prior art processes require buffers, neutralizers, initiators, promoters, modifiers, inhibitors and/or catalysts in order to promote the oxidation of the olefin and combat the deleterious effects of by-products such as acidic components.

It is known that olefin oxidations give, in addition to epoxides, various by-products such as water, formic acid and acetic acid which can be deleterious to the oxidation when present in appreciable quantities by reacting with the olefin oxide to give corresponding glycol and glycol derivatives as well as undesired polymeric materials. Prior art methods have used a variety of approaches to counteract these deleterious effects, such as the use of water-immiscible hydrocarbon solvents containing inhibitors or utilized in conjunction with a separate washing step with solutions of basic substances, in effect, processes which require acid removal in order for such water-immiscible hydrocarbon solvents to be used for the olefin oxidation.

Probably the most deleterious constituent is formic acid which by virtue of its strong acidity (stronger than acetic acid by a factor of 10) reacts with the desired olefin oxide to form undesirable by-products. It has been found that acetic acid, unlike formic acid, can be tolerated in the reaction mixture in much greater amounts than formic acid without producing any adverse effects. One way to remove the reactive formic acid from the reaction mixture is by salt formation, that is, by addition of an organic or inorganic base. However, these basic compounds are known to inhibit primary oxidation reactions and therefore cannot suitably be used. The formation of salts likewise presents additional mechanical problems due to a build-up thereof in the reaction and salt removal systems must be resorted to.

A feature of the present invention is the scavenging of the deleterious formic acid as it is produced in the reaction through the use of an ester of the class described herein, such as methyl acetate. An advantage of using these esters as an acid scavenger is that a stable neutral material, i.e., the ester is used to remove the strong formic acid by ester interchange and at the same time yield relatively innocuous products.

In order to use the presently-described esters as an oxidation solvent, the acid and alcohol moieties that make up the ester must have inherent oxidative and thermal stability or these properties must arise as the result of ester formation between the two moieties. The oxidative stability herein referred to has reference to the stability of these compounds toward air or molecular oxygen. In making reference to the oxidative stability of a particular compound it is necessary to make reference to the oxidizing agent, that is, the oxidants used in the reaction. For some compounds stable to chromic acid or potassium permanganate are not stable to other oxidizing agents. For example, alkaline hydrogen peroxide is a specific oxidant for epoxidation of conjugated double bonds. Yet, the instant esters are not a suitable medium for the use of alkaline hydrogen peroxide in epoxidation of such double bonds because the esters react with the alkali to form a metal salt without production of epoxide.

Oxidation substrates also behave differently with respect to the oxidant being used. For example, the acid-catalyzed reaction of peracetic or perbenzoic acid with cyclohexane will yield the epoxide. However, the reaction of nitric acid or of permanganate on the same substrate will yield different products, e.g., using photoxidation with light and in the presence of a catalyst the methylene group adjacent to the double bond is attacked to give a hydroperoxide and the double bond is not attacked. Hydrogen peroxide, whether acidic or basic or as the rarely used neutral compound, is known not to attack methylene groups. On the other hand, these groups are susceptible to attack not only by molecular oxygen, but also by nitric acid, chromic acid, permanganate, and many of the other stronger oxidants. It is for these reasons that the esters used in the present invention must be those which do not contain reactive methylene groups or labile hydrogen atoms on the alpha-carbon of the ester. The importance of this requirement is shown by the fact that lower acetates, i.e., those having up to four carbon atoms in a straight chain of the alcohol moiety of the ester, are stable in the present oxidation system, while homologous acetates having more than four straight chain carbon atoms in the alcohol moiety, e.g., amyl acetate, are unstable.

It is a primary feature of the instant invention that the acetic acid ester solvents used herein need no added substances to counteract the deleterious effect of water and acids. Furthermore, the solvents used herein for the olefin oxidation preferably are not water-immiscible, hence, avoid the problems engendered with a two phase reaction system arising from the use of water-immiscible solvents. Moreover, by use of the instant solvents a surprisingly substantial quantity of water and organic acids can be tolerated without undue adverse effects upon the course of the olefin epoxidation.

It is a further feature of the instant invention that the olefin oxidations proceed at such a rapid rate that the oxygen is quantitatively consumed, hence, accumulation of potentially hazardous explosive mixtures of oxygen and organic materials in the vapor state are avoided.

It is further apparent that there is no criticality insofar as pH is concerned for this oxidation since appreciable concentrations of acid by-products, for example, up to 20 weight percent of acetic acid is not particularly deleterious. Hence, the olefin oxidation in the present solvents proceeds suitably over a range of pH's as low as pH 4 and in neutral and alkaline pH ranges.

Substantial evidence exists that these olefin oxidations, for example, propylene to propylene oxide, by direct oxidation with molecular oxygen are propagated by a free radical chain mechanism. Copper and its compounds are strong inhibitors for this propylene oxidation; an inhibition probably due to a redox reaction of copper with peroxy radicals which interrupts the chain propagation sequence and prevents attainment of a long kinetic chain necessary for reasonable conversion of the olefin. In addition, when free radical inhibitors, that is, antioxidants are added to the reaction mixture, partial or complete inhibition of the olefin oxidation occurs. In the absence of such inhibitors a very rapid, vigorous exothermic oxidation of the olefin occurs in the solvent. Furthermore, the present solvents are apparently very resistant to free radical attack and are recovered substantially unchanged. On the contrary, among prior art solvents benzene is an example of a compound which is readily attacked by free radicals. Such a benzene radical can react with oxygen to give phenolic or quinonoid-type molecules which are known to be efficient inhibitors for radical chain oxidations. Thus, when benzene is used as a solvent for an olefin oxidation its susceptibility to free radical attack gives rise to an effect which might be called autoinhibition, that is, the rate of oxidation of the olefin decreases with time. In comparison, the acetic acid ester solvents which have a high order of resistance to radical attack do not impede the radical chain sequence and the rate of oxidation of the olefin is not effected; the olefin oxidation proceeds to the depletion of either the olefin or the oxygen.

In addition to the foregoing advantages, acetic acid esters, e.g., methyl acetate as a solvent, appear as a by-product in many olefin oxidations, e.g., propylene to propylene oxide, and this offers the opportunity of making up possible mechanical losses of solvent during continuous operation.

The acetic acid ester solvents used in the instant invention constitute a suitable reaction medium for substantially all olefin oxidations with molecular oxygen to form olefin oxides. The term "molecular oxygen" as used herein includes pure or impure oxygen as well as gases containing free oxygen, for example, air.

Olefins suitable for use herein preferably include those of the ethylenic and cycloethylenic series up to 18 carbon atoms per molecule, e.g., ethylene, propylene, butenes, pentenes, hexenes, heptenes, octenes, nonenes, decenes, undecenes, dodecenes, pentadecenes, heptadecenes, octadecenes, cyclobutenes, cyclopentenes, cyclohexenes, cyclooctenes, and the like. Of particular interest, utility and convenience are the olefins containing from 2 to 8 carbon atoms. Included are the alkyl-substituted olefins such as 2-methyl-1-butene, 2-methyl-2-butene, 4-methyl-2-pentene, 2-ethyl-3-methyl-1-butene, 2,3-dimethyl-2-butene and 2-methyl-2-pentene. Other suitable olefinic compounds include isobutylene, conjugated and unconjugated dienes including the butadienes, e.g., 1,3-butadiene, isoprene, other pentadienes, hexadienes, heptadienes, octadienes, decadienes, dodecadienes, octadecadienes; cyclopentenes, cyclohexenes; aryl-substituted cycloalkenes and cycloalkadienes such as 1 - phenyl-1-cyclohexene, 3-(1-naphthyl)-1-cyclopentene, 1 - (1 - biphenylyl)1-3-cyclohexadiene; vinyl-substituted cycloalkenes, such as 4-vinyl-1-cyclohexene, 4-vinyl-1,4-dimethyl-1-cyclohexene; vinyl-substituted benzenes, such as 4-methylstyrene, 4-phenylstyrene, 1,4-divinyl-benzene; cyclopentadiene; dicyclopentadiene; alkyl-substituted cycloalkenes and cycloalkadienes; styrene, α-methylstyrene, methylstyrenes; unsaturated macromolecules, such as homopolymers of butadiene and isoprene and copolymers thereof, e.g., polybutadiene, natural rubber, butadiene/styrene copolymers, butyl rubber, butadiene/acrylonitrile copolymers, and the like.

Particularly suitable olefin feed stocks contemplated in the instant invention include the pure olefin or mixtures thereof or olefin stocks containing as much as 50% or more of saturated compounds. Olefinic feed materials include those formed by cracking petroleum stock such as hydrocarbon oils, paraffin wax, lubricating oil stocks, gas oils, kerosenes, napthas and the like.

The reaction temperatures used in liquid phase olefin oxidations using the solvents of the instant invention are subject only to a lower limit below which the oxidation either proceeds too slowly or follows a course other than that leading to olefin oxides. The upper limit of the temperature range is that which may be termed a threshold above which substantial decomposition, polymerization or excessive oxidative side reactions occur, thereby leading to undesirable side reactions and products which substantially detract from the yield of the olefin oxide. In general, temperatures of the order of 100° C. to 300° C. are contemplated. It is expedient to maintain temperatures at a sufficiently high level to insure thermal decomposition of hazardous peroxides which may be formed and accumulated to the point of unsafe operation. Within this general temperature range preferred temperatures are within 140–250° C.

Subatmospheric, atmospheric or superatmospheric pressures are suitable for use in the instant invention, that is, ranging from 0.5 to 150 atmospheres. Usually the oxidation reaction is facilitated by the use of higher pressures, hence a preferred pressure range is from 10 to 100 atmospheres. Pressures herein delineated and temperatures described previously will generally be selected, of course, depending upon the characteristics of the individual olefin which is to be oxidized to the olefin oxide, but this combination of temperatures and pressures will be such as to maintain a liquid phase. Olefin oxidations in the instant solvents are autocatalytic, that is, they are free radical chain reaction mechanisms, and the reactions proceed very rapidly after a brief induction period and give remarkably controllable product composition over wide variations of conditions. A typical olefin oxidation, for example, propylene in batch operation, requires from about 1 to 20 minutes. Similar, or faster, reaction rates occur in continuous operation. The reaction vessel for conducting this olefin oxidation can be made of materials which may include almost any kind of ceramic material, porcelain, glass, silica, various metals, such as stainless steels, Monel, aluminum, silver and nickel, which vessels do not necessarily have to conform to any particular geometric design. It should be noted in the instant invention that no added catalysts are necessary and no reliance is placed upon catalytic activity of the walls of the reactor or reactor components.

Various means known to the art can be utilized for establishing intimate contact to the reactants, i.e., olefin and molecular oxygen in the solvent, for example, by stirring, sparging, shaking, vibration, spraying or other various agitation in the reaction mixture. The vigorous agitation of the reaction mixture affects not only intimate contact of olefin and oxygen, but also facilitates removal of the heat of reaction to suitably oriented heat exchangers. It is to be noted, also that the exothermic nature of the olefin oxidation is such that very small or negligible amounts of heat need be applied to the reaction system in order to maintain the desired temperature of operation, hence, reaction temperature is adequately maintained by suitable design and proper use of heat exchange components.

As noted above, no added catalysts are required in the present invention. The usual oxidation catalysts can be tolerated although usually no significant benefit accrues from their use because the olefin oxidations proceed in such facile manner in the solvents of the instant invention. Oxidation catalysts such as platinum, selenium, manganese, silver, vanadium, chromium, cobalt, cadmium, nickel, cerium, iron and mercury in metallic or compound form, preferably as oxide or carbonate or as soluble acetates or carboxylates may be present singly or mixed in gross form supported or unsupported or as finely-divided suspensions or in solutions in the solvent.

It should also be noted that since olefin oxidations according to this invention proceed at such a rapid rate after a brief induction period no initiators, accelerators, or promoters are required, but these may be used to shorten or eliminate the brief induction period after which no additional initiator, promoter or accelerator need be added. Suitable initiators, accelerators or promoters include organic peroxides such as benzoyl peroxide, tertiarybutylhydroperoxide, ditertiarybutyl peroxide; inorganic peroxides such as hydrogen and sodium peroxides; organic peracids such as peracetic and perbenzoic acid or various other peroxidic derivatives such as the hydroperoxide addition products of ketones and aldehydes. Also useful as initiators, promoters, or accelerators for the purpose of reducing the time of the induction period, but following which induction period no more need be added are readily oxidizable materials such as aldehydes, acetaldehyde, propionaldehyde, isobutyraldehyde and the like and ethers such as diethyl ether, diisopropyl ether.

The reaction mixtures to be used in carrying out the process of the instant invention may be made up in a variety of ways. Exemplary combinations are the olefin and/or oxygen premixed with the solvent, suitably up to 50% by weight and, preferably, from 5% to 30% by weight based on the solvent, and the oxygen added thereto. The solvent-to-olefin molar ratio will vary from 1 to 10. The oxygen-containing gas may be introduced into the olefin-solvent mixture incrementally or continuously. Or, the reactor may be charged with solvent and the olefin and oxygen gas may be introduced simultaneously through separate feed lines into the body of the pure solvent in a suitable reaction vessel. In one embodiment the olefin and oxygen-containing gas mixture is introduced into the solvent in a continuously stirred reactor, under the conditions of temperature and pressure selected for this particular olefin. Suitable olefin to oxygen volumetric ratios are within the range of 1 to 5 up to 15 to 1. Feed rates, generally, of oxygen or oxygen-containing gas may vary from 0.5 to 1500 cubic feet per hour or higher and will largely depend upon reactor size within production quantity desired. The oxygen input is adjusted in such manner as to allow virtually complete usage of oxygen, thereby keeping the oxygen concentration in the off-gas above the reaction mixture below about 1% in order to prevent a hazardous concentration of explosive gases. Proper adjustment of feed rates is of importance in order that the olefin not be stripped from the liquid phase, thus reducing its concentration, hence reducing the rate of oxidation of the olefin which would result in lower conversions per unit time of olefin to olefin oxide.

In the preferred mode of operation the acetate solvents used herein constitute the major proportion of the liquid reaction medium with respect to all other constituents including reactants, oxidation products and co-products dissolved therein. By major is meant that enough solvent is always present to exceed the combined weight of all other constituents. However, it is within the purview of this invention, although a less preferred embodiment, to operate in such manner that the combined weight of all components in the liquid phase other than the acetate solvent exceeds that of the solvent itself. For example, a refinery grade hydrocarbon feedstock or a crude hydrocarbon feedstock containing, e.g., 50% by weight of the olefin to be oxidized, e.g., propylene, and 50% by weight of saturated hydrocarbons, e.g., an alkane such as propane, may be used in quantities up to 50% by weight based on the solvent. Upon oxidizing this feedstock, unreacted olefin, alkane and oxygen together with oxidation products including the olefin oxide, various acids, alcohols, aldehydes, esters, ketones and water, e.g., acetic acid, formic acid, methanol, acetaldehyde, methyl acetate, methyl formate, acetone, propylene glycol and esters thereof, e.g., propylene glycol diacetate, and high boilers (components having boiling points higher than that of the solvent, e.g., residue) that are formed in the reaction and/or recycled to the reactor may constitute as much as 75% by weight of the liquid reaction medium, according to reaction conditions or recycle conditions.

When carrying out the invention according to the less preferred mode of operation, the quantity of solvent present in the liquid reaction medium should be not less than 25% by weight of said medium in order to advantageously utilize the aforementioned benefits characteristic to these unique olefin oxidation solvents.

In further embodiments of the present invention for oxidizing olefins with molecular oxygen in the liquid phase, the acetic acid ester solvents described herein are suitably used in combination with diluents or auxiliary solvents which are relatively chemically indifferent, oxidatively and thermally stable under reaction conditions. Here, too, the present acetate solvents should be utilized in quantities not less than 25% by weight of the liquid reaction medium in order to retain the superior benefits of these solvents in liquid phase olefin oxidations.

Suitable diluents which may be utilized with the acetate solvents of this invention include, e.g., hydrocarbons such as benzene, cyclohexane, toluene, xylenes, kerosene, biphenyl and the like; halogenated benzenes such as chlorobenzenes, e.g., chlorobenzene and the like; dicarboxylic acid esters such as dialkyl phthalates, oxalates, malonates, succinates, adipates, sebacates, e.g., dibutyl phthalate, dimethyl succinate, dimethyl adipate, dimethyl sebacate, dimethyl oxalate, dimethyl malonate and the like; aromatic ethers such as diaryl ethers, e.g., diphenyl ether; halogenated aryl ethers such as 4,4'-dichlorodiphenyl ether and the like; dialkyl and diaryl sulfoxides, e.g., dimethyl sulfoxide and diphenyl sulfoxide; dialkyl and diaryl sulfones, e.g., dimethyl sulfone and dixylyl sulfone; chloroform, carbon tetrachloride and nitroalkanes, e.g., nitromethane. While the foregoing have been cited as typical diluents which may be used in combination with the solvents of this invention, it is to be understood that these are not the only diluents which can be used. In fact, the benefits accruing from the use of the present solvents can be utilized advantageously when substantially any relatively chemically indifferent diluent is combined therewith.

Therefore, the present invention in its broadest use comprehends the oxidation of olefin-containing feedstocks in a liquid reaction medium consisting essentially of at least 25% by weight based on said medium of at least one of the acetate solvents described above.

In any case, the liquid reaction medium referred to herein is defined as that portion of the total reactor content which is in the liquid phase.

The oxidation products are removed from the reactor as a combined liquid and gaseous effluent containing the olefin oxide and unreacted components by properly adjusting the conditions of temperature and pressure and by adjustment of a let-down system, or the entire reaction mixture containing the oxidation products is removed from the reactor; conventional techniques for separation of desired product including distillation, fractionation, extraction, crystallizations and the like, are employed to effect separation of the desired olefin oxide. One procedure comprises continually removing the liquid effluent from the reaction zone to a distillation column and removing various fractions of products contained therein, in effect, a fractionation to obtain the olefin oxide. From such suitable fractionation process the solvent is recovered and is recycled to the reaction zone.

The invention will be more fully understood by reference to the illustrative specific embodiments presented below.

A modified cylindrical Hoke high pressure vessel is employed for the batch-type oxidations described below. A high pressure fitting was welded to the vessel near one end to serve as gas inlet, and a block valve with rupture disc was attached to this fitting with a one-quarter inch high pressure tubing "goose-neck." A thermocouple was sealed into the one end opening of the vessel. The solvent and initiator (if any employed) are then charged through the other end opening which is then sealed with the plug. The olefin is then charged to the desired amount, as determined by weight difference, that is, the olefin, if normally gaseous, is charged under pressure, and if normally liquid, may be charged into one of the end openings along with solvent, and the charged vessel is affixed to a bracket attached to a motor driven eccentric which provides vertical vibrational agitation. The tubular Hoke vessel is clamped in a horizontal position in order that the maximum agitation of contents ensues. This vibrating reaction vessel can be immersed in a hot bath for heating to reaction temperatures and removed, then immersed in a cold bath to quench to room temperature.

*Example I*

To a 150-ml. pressure vessel fitted with a thermocouple, rupture disc and gas inlet tube was charged 25.8 g. of methyl acetate containing 0.13 g. of acetaldehyde and 7.98 g. of propylene. The reactor was sealed, mounted on an agitator assembly and immersed in an oil bath maintained at 200°. When thermal equilibrium was reached, oxygen was admitted to the reactor at 650 p.s.i.g. pressure. After two minutes reaction time, an additional 100 p.s.i.g. oxygen pressure was added to the system making a total overpressure of 300 p.s.i.g. with respect to the autogeneous reactor pressure at 200° C. A maximum temperature of 210° C. was reached during the oxidation which started immediately upon introduction of the oxygen. After a reaction time of five minutes, the addition of oxygen to the system was stopped and the reactor was immersed in a cold water bath.

Analyses of the reactor contents showed the following yields of principal liquid products based on a 10% propylene conversion.

| Compound: | Percent yield |
|---|---|
| Propylene oxide | 49.4 |
| Acetaldehyde | 14.1 |
| Methyl formate | 2.9 |
| Formic acid | 11.9 |
| Water | 15.8 |

*Example II*

To a pressure reactor of the type discussed above is charged 25 g. of methyl acetate containing 0.1 g. of acetaldehyde and about 5.0 g. of ethylene. The sealed reactor is attached to the agitator assembly and immersed in a hot oil bath at 200° C. When thermal equilibrium is reached within the reactor, oxygen is introduced to a total overpressure of 300 p.s.i.g. The oxidation is carried on for seven minutes, then terminated as in the above example. Analyses indicate a 12% conversion of ethylene to oxygenated products including a 25% yield of ethylene oxide.

*Example III*

To a pressure reactor similar to the above type is charged 30 g. of methyl acetate, 0.15 g. acetaldehyde and about 8 g. 2-methyl-2-butene. The sealed reactor is attached to an agitator assembly and immersed in an oil bath at 160° C. When thermal equilibrium is reached within the reactor, an oxygen overpressure of 100 p.s.i.g. is introduced to initiate the reaction followed after a 2 minute interval by an additional 100 p.s.i.g. overpressure of oxygen. After a total reaction period of about 10 minutes, oxygen addition is ceased, and the reactor is cooled in a cold water bath. Analyses indicate a 43% conversion of olefin to oxygenated products with the major product being 2-methyl-2,3-epoxybutane obtained in 46% yield.

*Example IV*

To a 1-liter top-stirred stainless steel reactor was charged 119 g. of propylene, 296 g. of methyl acetate, 0.3 g. mercuric acetate and 3 ml. of acetaldehyde. The reactor was heated to 180° C. and oxygen addition was initiated. The oxidation began almost immediately as evidenced by a rise in temperature from heat of reaction. The oxidation was run for forty minutes with a final temperature and pressure of 203° C. and 1150 p.s.i.g., respectively. There was obtained 129 g. of liquid oxygenated products of which propylene oxide was the major constituent in approximately 38% yield.

*Example V*

To a Hoke pressure vessel as described is charged 25 g. of methyl acetate, 0.1 g. acetaldehyde and about 5 g. styrene. The sealed vessel is attached to an agitator assembly and immersed in an oil bath at 140° C. After thermal equilibrium is reached within the reactor, oxygen is added gradually over an approximate 10 minute reaction period to a total oxygen pressure of 250 p.s.i.g. The reaction is quenched as above to obtain a 55% conversion of olefin to oxygenated products among which styrene oxide is a major constituent.

*Example VI*

To a pressure reactor is charged methyl acetate, acetaldehyde initiator and butadiene. The sealed reactor is attached to an agitator assembly and immersed in an oil bath at 160° C. When thermal equilibrium is attained, oxygen is introduced to a total pressure of 200 p.s.i.g. over a reaction period of about 8 minutes. The oxygen is shut off and the reactor is cooled in a cold water bath. Analyses indicate a 55% conversion to oxygenated products containing butadiene oxide in 22% yield.

The following example illustrates the inoperability of a homologous alkyl acetate, having more than four straight chain carbon atoms, typified by amyl acetate, as a reaction media for the molecular oxygen oxidation of olefins.

*Example VII*

To a 150-ml. Hoke pressure reactor as described above was charged 20 ml. of amyl acetate and 10 drops of acetaldehyde initiator. The reactor was attached to an agitator assembly and immersed in an oil bath at 175° C. When thermal equilibrium was reached, 50 p.s.i.g. of oxygen was introduced causing an immediate 12° rise in temperature resulting from exothermic oxidation of the solvent. Further small increments of oxygen addition over a 12 minute reaction period showed definite thermal evidence of oxidative attack of the solvent.

Chromatographic analysis of the gaseous and liquid products showed in addition to starting material, methanol, water, $CO_2$ plus four unknown products all resulting from oxidative degredation of amyl acetate.

*Example VIII*

This example exemplifies a continuous operation for olefin oxidation using methyl acetate as the reaction medium.

A 1.0 liter stirred stainless steel reactor is employed, fitted with three feedlines to introduce propylene, oxygen and methyl acetate solvent into a bottom inlet in the reactor. A product over-flow pipe drains gaseous and liquid product continuously into a separations system.

Using methyl acetate as solvent, the reactor is heated to 200° C. and propylene is charged to about 20% by weight of the solvent. The reaction is initiated by incremental additions of oxygen, then the three reactants are metered into the reactor as the oxidation products are continuously removed. In a typical run, the reactants are added at approximately the following hourly rates: propylene, 500 g., oxygen, 170 g., methyl acetate, 4400 g. At a steady reaction state with reactor residence time of about 4 minutes, the conversions are approximately, propylene 48%, and oxygen 97% and propylene oxide yield is approximately 48%.

*Example IX*

To a pressure reactor of the type discussed above is charged 25 g. of tertiarybutyl acetate containing 0.1 g. of acetaldehyde and about 5.0 g. of ethylene. The sealed reactor is attached to the agitator assembly and immersed in a hot oil bath at 200° C. When thermal equilibrium is reached within the reactor, oxygen is introduced to a total overpressure of 300 p.s.i.g. The oxidation is carried on for about seven minutes, then terminated as in the above examples. Analyses indicate a 12% conversion of ethylene to oxygenated products including a 25% yield of ethylene oxide.

*Example X*

To a pressure reactor similar to the above type is charged 30 g. of dimethyl trichloroethyl acetate, 0.15 g. acetaldehyde and 8 g. 2-methyl-2-butene. The sealed reactor is attached to an agitator assembly and immersed in an oil bath at 160° C. When thermal equilibrium is reached within the reactor, an oxygen overpressure of 200 p.s.i.g. is introduced to initiate the reaction followed after a 2 minute interval by an additional 100 p.s.i.g. overpressure of oxygen. After a total reaction period of about 10 minutes, oxygen addition is ceased, and the reactor is cooled in a cold water bath. Analyses indicate a 43% conversion of olefin to oxygenated products with the major product being 2-methyl-2,3-epoxybutane obtained in 46% yield.

*Example XI*

To a 1-liter top stirred stainless steel reactor is charged about 115 g. of propylene, 296 g. of 1-tertiarybutyl-2,2-difluorobutyl acetate, 0.3 g. mercuric acetate and 3 ml. of acetaldehyde. The reactor is heated to 180° C. and oxygen addition is initiated. The oxidation begins almost immediately as evidenced by a rise in temperature from heat of reaction. The oxidation proceeds for about forty minutes with a final temperature and pressure of 203° C. and 1150 p.s.i.g. respectively. There is obtained approximately 121 g. of liquid oxygenated products of which propylene oxide was the major constitutent in about 38% yield. Methyl acetate in about 5% yield is also produced.

*Example XII*

To a Hoke pressure vessel as described above is charged 25 g. of 1,1,3,3-tetramethylbutyl acetate, 0.1 g. acetaldehyde and 5 g. styrene. The sealed vessel is attached to an agitator assembly and immersed in an oil bath at 140° C. After thermal equilibrium is reached within the reactor, oxygen is added gradually over about a 10 minute reaction period to a total oxygen pressure of 250 p.s.i.g. The reaction is quenched as above to obtain an approximate 55% conversion of olefin to oxygenated products among which styrene oxide is a major constituent.

*Example XIII*

To a pressure reactor is charged neopentyl acetate, acetaldehyde initiator and butadiene. The sealed reactor is attached to an agitator assembly and immersed in an oil bath at 160° C. When thermal equilibrium is attained, oxygen is introduced to a total pressure of 200 p.s.i.g. over a reaction period of about 8 minutes. The oxygen is shut off and the reactor is cooled in a cold water bath. Analyses indicate a 55% conversion to oxygenated products containing butadiene oxide in about 22% yield.

*Example XIV*

To a similar reactor as above was charged 25.3 g. of ethyl acetate, 0.2 g. of acetaldehyde initiator and 9.6 g. of propylene. The sealed reactor was mounted on an agitator assembly and lowered into an oil bath at 190° C. After thermal equilibrium was reached, oxygen was introduced gradually up to a total of 300 p.s.i.g. over a reaction interval of 10 minutes. The reaction is quenched as above and analyses of the products indicate an 11% conversion of propylene and 49% yield of propylene oxide and 2% yield of methyl acetate.

*Example XV*

In a continuous operation similar to that described above, methyl acetate solvent, 1,3-butadiene and oxygen are fed to a reactor heated to 150° C. and pressured to 50 atmospheres. At steady state, reactor residence time of about 4.5 minutes, butadiene conversion is 45%, oxygen conversion, 99.9% and butadiene oxide yield, 28 mole percent.

*Example XVI*

The same procedure described in the preceding example is repeated in the continuous production of styrene oxide. Using butyl acetate as solvent, the reactor is heated to 180° C. under 50 atmospheres pressure, and styrene is fed to the reactor to about 15% by weight of the solvent. Oxygen is then added slowly and continuously to start the reaction and the three components fed into the system. At steady state, reactor residence time about 4 minutes, styrene conversion is 65%, oxygen conversion, 99.9% and styrene oxide yield, 52 mole percent.

*Example XVII*

In a continuous operation similar to that described above, tertiary butyl acetate solvent, 1-phenyl-1-cyclohexene and oxygen are fed to the reactor. The reactor is heated to 150° C. and pressured to 51 atmospheres. At steady state, reactor residence time of about 4.5 minutes, 1-phenyl-1-cyclohexene conversion is 42%, oxygen conversion 98% and 1-phenyl-1-cyclohexene oxide is obtained in 20 mole percent yield.

*Example XVIII*

In a procedure similar to that described in the preceding examples, 1,1-dimethylpropyl acetate as solvent is fed, together with 4-vinyl-1-cyclosexene and oxygen, to a reactor heated to 170° C. and pressured to 50 atmospheres. At steady state 4-vinyl-1-cyclohexene conversion is 45% oxygen conversion 98% and vinyl-1-cyclohexene oxide yield 25 mole percent.

The following example illustrates an embodiment of the invention wherein a relatively small quantity of an acetate solvent is employed as solvent in the production of an olefin oxide and as co-products significant quantities of other components useful in commerce which components are derived from propylene oxide. The observed yield of propylene oxide, per se, is relatively low in this example because of in situ transformation to these co-products.

*Example XIX*

In a continuous operation employing a 300-ml. stainless steel autoclave, reactants are fed to the reactor at approximately the following hourly rates: methylacetate, 350 g., non-volatile product residue of a previous propylene oxidation run, 450 g., propylene, 350 g. and oxygen, 150 g. The reactor is maintained at approximately 200° C. and a pressure of 50 atmospheres. At steady state, reactor residence time about 4 minutes, the methyl acetate content of the liquid phase is about 26 weight percent. The propylene conversion is 30% and the oxygen conversion 98.3%. Among the products formed, propylene oxide is obtained in approximately 17 mole percent yield, propylene glycol in about 7.5 mole percent yield, and the combined yields of propylene glycol monoformate and propylene glycol mono-acetate (via reaction of formed propylene oxide with formed formic and acetic acids) is 11 mole percent; thus, the combined yield, based on propylene, of propylene oxide and the simple derivatives thereof, such as propylene glycol and propylene glycol mono-esters, is about 36 mole percent.

The following example illustrates an attempt to prepare an olefin oxide in a liquid reaction medium similar to that in the preceding example, except in this example, the acetate solvent, methyl acetate, was omitted from the reaction.

*Example XX*

Into a 150-ml. Hoke reaction vessel, described in previous examples, was placed 25.44 g. of the non-volatile product residue material described and used in Example XIX. To this material was added 0.12 g. of acetaldehyde and 6.34 g. of propylene. No methyl acetate was added to the reaction vessel. The reaction vessel was affixed to the agitator yoke of the vibrator apparatus and immersed in a hot polyethylene glycol bath until complete equilibration at 200° C. was reached. The autogenous pressure of the reactor at equilibrium was 160 p.s.i.g., whereupon oxygen was added to a total pressure of 360 p.s.i.g., then subsequently oxygen pressure was raised to 510 p.s.i.g. after 5 minutes had elapsed. The oxidation appeared to be slow, judging by the low exotherm produced, and was allowed to proceed for 10 minutes. At this time the oxygen was turned off and the vessel was immersed in the cold water bath. The contents of the reaction vessel were analyzed by vapor phase chromatography and found to contain no propylene oxide whatsoever, i.e., 0% yield of propylene oxide. Only small quantities of other products, normal co-products of propylene oxidations, were found in this oxidation mixture. Thus, in using this high-boiling polymeric products of propylene oxidation as the solvent for propylene oxidation no propylene oxide was produced and a strong overall inhibition of the oxidation was observed.

The following example illustrates that embodiment of the invention wherein an olefin oxide is prepared by oxidizing an olefin in a liquid reaction medium comprised of an acetate solvent in combination with a hydrocarbon diluent.

*Example XXI*

In a continuous operation similar to that described above, methyl acetate solvent and benzene as diluent (1:1 mixture by weight), propylene and oxygen are fed to the reactor. The reactor is heated to 200° C. and pressured to 50 atmospheres. At steady state, reactor residence time of about 4 minutes, propylene conversion is 30%, oxygen conversion is 99% and propylene oxide is obtained in 37 mole percent yield.

*Example XXII*

Similarly to the above, isopropyl acetate solvent and diphenyl ether as diluent (1:1 mixture by weight), propylene and oxygen are fed to the reactor. The reactor is heated to 180° C. and pressured to 50 atmospheres. At steady state, reactor residence time of about 4 minutes, propylene conversion is 25%, oxygen conversion is 98%, and propylene oxide is obtained in 42 mole percent yield.

In like manner, any of the above-mentioned diluents may be combined with the acetate solvents of this invention to provide a liquid phase oxidation medium consisting of no less than 25% by weight based on said medium of said solvent.

*Example XXIII*

This example is illustrative of that embodiment of the invention wherein a mixture of acetic acid esters is used as solvent in a continuous operation.

A mixed solvent of methyl acetate and ethyl acetate (50–50 wt. percent), isoprene and oxygen are fed to a reactor heated to about 150° C. and pressured to 50 atmospheres. At steady state, reactor residence time of about 4 minutes, isoprene conversion is 45%, oxygen conversion 99.8% and isoprene oxide yield 29 mole percent.

When this example is repeated using a mixed solvent of isopropyl acetate-butyl acetate (70–30 wt. percent), the results are substantially the same.

*Example XXIV*

Using a mixed solvent of methyl and isopropyl acetates (50–50 wt. percent), the reactor is heated to 200° C. and pressured to 50 atmospheres. Propylene is charged to about 20% by weight of the solvent. Oxygen, propylene and solvent are then metered into the reactor at approximately the following hourly rates: oxygen, 170 g., propylene, 500 g. and solvent, 4400 g. At a steady reaction state with reactor residence time of about 4 minutes, the conversions are, approximately, propylene 48% and oxygen 98%. Propylene oxide yield is about 48%.

Although the foregoing description and specific examples are directed to the preparation of epoxides of olefins by the oxidation of olefins with molecular oxygen in a liquid reaction medium comprising acetic acid esters described herein, it is within the purview of this invention to utilize this versatile reaction medium to prepare epoxides of other epoxidizable olefinic compounds in similar oxidations of other compounds containing olefinically unsaturated linkages such as hydrocarbons, halohydrocarbons, alcohols, ethers, ketones, acids, esters, amides, imides, nitriles and phosphorus esters. Typical ethylenically unsaturated compounds which are contemplated include allyl diphenyl phosphate, dicrotyl phenyl phosphate, allyl chloride, crotyl chloride, mono-and di-chlorobutenes, methallyl chloride, o-, m-, and p-chlorostyrene, 3-pentenol-1, 9-octadecenol-1, 2-ethylhexenol-2, cyclopentenol, 3-cyclohexenylmethanol, diallyl ether, butyl crotyl ether, 4-pentenyl butyl ether, butyl 3-dodecenyl ether, 1,4-pentadienyl butyl ether, 3-pentenonitrile, 4-cyanocyclohexene, N-crotylphthalimide, N-allylphthalimide, cinnamic acid, vinylacetic acid, allyl acetate, crotyl acrylate, methyl allyl ketone, methyl 2-pentenyl ketone, ethylene glycol methacrylate, propylene glycol diacrylate, methyl methacrylate and the like.

Polyepoxides of compounds of the above-recited classes of compounds having a plurality of double bonds are also prepared according to the process of the present invention. For example, polymers of diolefins having 4–6 carbon atoms, when used as starting materials yield polydiene-epoxides suitable for use in textile finishing.

Variations and modifications of the instant invention will occur to those skilled in the art without departing from the spirit and scope thereof.

I claim:

1. Process for the preparation of olefin oxides which comprises oxidizing epoxidizable olefinically unsaturated compounds with molecular oxygen in a solvent selected from the group consisting of acetic acid esters having the formula

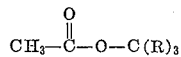

and mixtures thereof, wherein each R is selected from the group consisting of hydrogen, straight chain alkyl and haloalkyl groups having from 1 to 3 carbon atoms and straight chain alkyl and haloalkyl groups having from 1 to 3 carbon atoms having as substituents on other than the terminal carbon atom thereof at least one member selected from the group consisting of alkyl and haloalkyl groups having from 1 to 3 carbon atoms, provided that no more than one methylene group is attached to the alpha-carbon atom.

2. Process according to claim 1 wherein said olefinically unsaturated compound is propylene and said olefin oxide is propylene oxide.

3. Process according to claim 1 wherein said olefinically unsaturated compound is butadiene and said olefin oxide is butadiene oxide.

4. Process according to claim 1 wherein said olefinically unsaturated compound is isoprene and said olefin oxide is isoprene oxide.

5. Process according to claim 1 wherein said olefinically unsaturated compound is styrene and said olefin oxide is styrene oxide.

6. Process according to claim 1 wherein said olefinically unsaturated compound is oxidized at temperatures within the range of from 100° C. to 300° C. and pressures within the range of from 0.5 to 150 atmospheres.

7. Process according to claim 1 wherein the oxidation occurs in the absence of added catalysts.

8. Process for the preparation of propylene oxide which comprises oxidizing propylene with molecular oxygen at a temperature within the range of from 140° C. to 250° C. and a pressure within the range of from 10 to 100 atmospheres in a solvent as described in claim 1.

9. Process according to claim 8 wherein said solvent comprises methyl acetate.

10. Process according to claim 8 wherein said solvent comprises ethyl acetate.

11. Process according to claim 8 wherein said solvent comprises isopropyl acetate.

12. Process according to claim 8 wherein said solvent comprises a mixture of said acetic acid esters.

13. Process according to claim 8 wherein the oxidation occurs in the absence of added catalysts.

References Cited by the Examiner

UNITED STATES PATENTS

| | | | |
|---|---|---|---|
| 2,475,605 | 7/1949 | Prutton et al. | 260—348.5 |
| 2,784,202 | 3/1957 | Gardner | 260—348.5 |
| 2,833,813 | 5/1958 | Wallace | 260—502 |
| 2,985,668 | 5/1961 | Shingu | 260—348.5 |

FOREIGN PATENTS 917,926   2/1963   Great Britain.

WALTER A. MODANCE, *Primary Examiner.*

NICHOLAS S. RIZZO, *Examiner.*

N. S. MILESTONE, *Assistant Examiner.*